United States Patent [19]

Schonauer et al.

[11] Patent Number: 4,929,461

[45] Date of Patent: May 29, 1990

[54] PROCESS FOR PRODUCING BATCH TYPE POTATO CHIPS ON A CONTINUOUS BASIS

[75] Inventors: Sylvia L. Schonauer; Linda M. Medina, both of Irving; Donald V. Neel, Lewisville, all of Tex.

[73] Assignee: Frito-Lay, Inc., Dallas, Tex.

[21] Appl. No.: 262,127

[22] Filed: Oct. 25, 1988

Related U.S. Application Data

[63] Continuation of Ser. No. 6/944,208, Dec. 22, 1986, abandoned.

[51] Int. Cl.$^5$ .............................................. A23L 1/217
[52] U.S. Cl. .................................... 426/438; 426/637; 426/808
[58] Field of Search ................ 426/438, 637, 441, 808

[56] References Cited

U.S. PATENT DOCUMENTS

| | | |
|---|---|---|
| 2,207,316 | 7/1940 | Ferry . |
| 2,286,644 | 6/1942 | Pringle et al. . |
| 2,611,705 | 9/1952 | Hendel . |
| 2,685,249 | 8/1954 | Badger . |
| 2,812,254 | 11/1957 | Smith, Jr. . |
| 2,825,649 | 3/1958 | Stahmer . |
| 2,836,496 | 5/1958 | Salvo . |
| 2,855,308 | 10/1958 | Buechele et al. . |
| 2,886,439 | 5/1959 | Eytinge . |
| 3,026,885 | 3/1962 | Eytinge . |
| 3,213,778 | 10/1965 | Martino . |
| 3,353,962 | 11/1967 | Smith, Jr. . |
| 3,484,252 | 12/1969 | Popeil . |
| 3,733,202 | 5/1973 | Marmor . |
| 3,754,468 | 8/1973 | Wright et al. . |
| 3,885,056 | 5/1975 | Smith et al. ........................ 426/441 |
| 3,970,072 | 7/1976 | Chipchase . |
| 3,998,975 | 12/1976 | Liepa .................................. 426/550 |
| 4,020,189 | 4/1977 | Wright et al. ...................... 426/438 |
| 4,272,554 | 6/1981 | Schroeder et al. ................ 426/321 |
| 4,277,510 | 7/1981 | Wicklund et al. ................. 426/441 |
| 4,363,823 | 12/1982 | Kimura et al. .................... 426/542 |
| 4,537,786 | 8/1985 | Bernard ............................. 426/438 |
| 4,741,912 | 5/1988 | Katz et al. ......................... 426/438 |

FOREIGN PATENT DOCUMENTS 750479 10/1970 Belgium .

OTHER PUBLICATIONS

Talburt, William F., et al., "Potato Processing"; The AVI Publishing Company, Inc., 1959; pp. 12-19.

*Primary Examiner*—Arthur L. Corbin
*Attorney, Agent, or Firm*—Bernard, Rothwell & Brown

[57] ABSTRACT

Potato chips having batch-fried texture and flavor characteristics are produced in a continuous process in a significantly reduced time by conveying potato slices through an initial frying region having a temperature of from about 115° C. to about 155° C. (about 240° F. to about 310° F.) and then through a final frying region having a temperature of from about 165° C. to about 185° C. (about 330° F. to about 365° F.).

10 Claims, 7 Drawing Sheets

PROCESS FOR PRODUCING BATCH TYPE POTATO CHIPS ON A CONTINUOUS BASIS

This is a continuation of application Ser. No. 944,208, filed Dec. 22, 1986, now abandoned.

BACKGROUND OF THE INVENTION

1. Field of the Invention

The present invention is in the field of frying potato slices to produce potato chips.

2. Description of the Background Art

Commercial production of potato chips typically involves a continuous process wherein sliced potatoes are continuously introduced into a vat of frying oil at a temperature of about 185° C. (about 365° F.) or higher, conveyed through the oil by paddles or other means, and removed from the oil after about 2½ to 3 minutes of frying by an endless conveyor belt when the moisture content of the chips has been reduced to about 2% by weight or less. The resulting product generally has texture and flavor characteristics which are usually recognizable by consumers as typical commercially produced continuous process potato chips.

Potato chips produced by batch processes in kettle friers have texture and flavor characteristics which are usually recognized by consumers as being distinctly different from typical commercially produced continuous process potato chips. As the name implies, batch process kettle frying of potato chips involves placing a batch of potato slices in a kettle of hot oil, e.g., at a temperature of about 150° C. (about 300° F.). Upon introduction of the potato slices into the oil, the temperature of the oil typically drops, sometimes by as much as about 30° C. (about 50° F.) or more, and then the temperature of the oil begins to gradually rise as the slices are fried to their bubble end point (BEP), generally, about 2% moisture content or less. The finished potato chips are removed as a batch from the kettle before frying another batch of potato slices. Typical batch frying can take ten minutes or longer to reach the bubble end point. The frying time varies depending on factors such as the loading ratio of chips to oil and the solids content of the potatoes being fried.

Batch fried chips are generally harder and more crunchy than continuously fried chips and have a flavor that some consumers find more appealing than typical continuously fried commercial chips. However, batch production of potato chips is not commercially desirable since batch processes are generally substantially more expensive and less efficient than continuous processes.

There thus remains a need in the art for an efficient continuous process for the production of potato chips having batch-fried texture and flavor characteristics.

SUMMARY OF THE INVENTION

In accordance with the present invention, a continuous process for the production of potato chips having a batch-fried texture and flavor comprises continuously introducing potato slices into an initial frying region of frying oil, the initial frying region having a temperature of from about 115° C. to about 155° C. (about 240° F. to about 310° F.). The potato slices then are continuously conveyed from the initial frying region to a final frying region of frying oil, the final frying region having a temperature of from about 165° C. to about 185° C. (about 330° F. to about 365° F.). The potato slices are finish-fried in the final frying region to form potato chips, whereupon the potato chips are continuously removed from the second frying region of frying oil.

DETAILED DESCRIPTION OF THE INVENTION

Applicants have discovered that potato chips having batch-fried texture and flavor characteristics can be produced in a continuous process more rapidly than batch frying by frying potato slices initially at a temperature substantially lower than in conventional continuous processes for commercially producing potato chips, and thereafter finish frying the potato chips in oil at a substantially higher temperature than during the initial fry.

While batch-fried chips fried at about 150° C. (about 300° F.) for 10 minutes or longer have texture and flavor characteristics that are substantially different than continuous fry chips fried at about 185° C. (about 365° F.) or higher for 2½ to 3 minutes, Applicants have surprisingly discovered that potato chips having batch-like flavor and texture characteristics can be produced in a continuous process by initially frying the chips at about 115°–155° C. (about 240°–310° F.) for about 1–3 minutes and thereafter finish frying the chips at a temperature of about 165°–185° C. (about 330°–365° F.) before removing the chips from the frying oil at their bubble end point.

Potato slices for making potato chips using this invention can be formed from potatoes by any of various known devices which are available for use in slicing potatoes to be made into potato chips. Typically, whole, raw potatoes may be scrubbed prior to slicing and may be either peeled or left unpeeled. If desired, the potatoes can be blanched prior to slicing by contacting the potatoes with water at a temperature of, for example, about 30°–60° C (about 90°–140° F.), for a short period of time such as from about 10 seconds to 3 minutes. Generally, individual potato slices having a thickness of from about 0.75 mm to about 2.5 mm (about 0.03 to 0.1 inch) have been found to be suitable for making into potato chips according to the process of the invention, although a slice thickness of from about 1.5 mm to 2.4 mm (about 0.06 to 0.095 inch) is preferred. After slicing, the slices may be washed to diminish the tendency of the slices to stick together or to stick to machinery.

In the process of the invention, potato slices are continuously introduced into an initial frying region of frying oil, the initial frying region having a temperature of from about 115° C. to about 155° C. (about 240° F. to about 310° F.). The potato slices remain in the initial frying region generally at least about 1 minute but usually not more than about 3 minutes to partially fry the slices. The potato slices then are continuously conveyed from the initial frying region to a final frying region of frying oil, the final frying region having a temperature of from about 165° C. to about 185° C. (about 330° F. to about 365° F.). The potato slices are finish-fried in the final frying region for about 5–6 minutes to form potato chips, whereupon the potato chips are continuously removed from the final frying region of frying oil.

Although the invention is herein described with reference to initial and final frying regions, it is to be understood that other schemes with various frying regions and transition regions may be utilized to achieve the desired temperature profile.

Although potato slices can be fried to a kettle-like batch fried texture using a continuous process at frying temperatures that remain at or below about 150° C. (about 300° F.), the frying times are much longer than in conventional continuous processes. However, Applicants have surprisingly found that an initial 115°-155° C. (about 240°-310° F.) low temperature fry for a short period of time, generally from one to about three minutes, conditions the slices for producing a final product having batch-fried hardness and flavor after a rapid 165°-185° C. (about 330°-365° F.) high temperature finish-fry.

Without being bound to any particular theory, it is believed that initial low temperature frying of the slices "sets up" the desired batch-like texture of the product or "case hardens" the slices before driving moisture out of the slices during the high temperature fry, to produce a final product having a moisture content of about 2% and batch-like texture and flavor, in a total frying time of from about 6 to about 8 minutes.

The process of this invention allows the production of uniform quality chips from potatoes having substantially varying characteristics depending on whether the potatoes are fresh crop or have been kept in storage. In general, the initial frying temperature is lower for slices produced from fresh crop potatoes than for slices produced from stored potatoes to produce chips having about the same batch-fried texture and flavor characteristics. For frying fresh crop potatoes, lower initial frying temperatures within the above range, such as between 115° C. and 135° C. (about 240°-275° F.) are preferred.

BRIEF DESCRIPTION OF THE DRAWINGS

☐: heat added to initial frying oil after about one minute frying time; about 6 minutes fry time total.

△: heat added to initial frying oil after about two minutes frying time; about 6¾ minutes fry time total.

*: heat added to initial frying oil after about three minutes frying time; about 7½ minutes fry time total.

X: heat added to initial frying oil after about four minutes frying time; about 8 minutes fry time total.

O: control-chips fried to completion in low temperature oil below 300° F.; about 8½ minutes fry time total.

*: initial frying temperature 300° F.; heat added at outset of frying to raise frying temperature to about 350° F. in about 2½ minutes.

☐: initial frying temperature 260° F.; heat added at outset of frying to raise frying temperature to about 345°-350° F. in about 4 minutes.

O: initial frying temperature 260° F.; heat added at outset of frying to raise frying temperature to about 335° F. in about 3½ minutes.

■: initial frying temperature 220° F.; heat added at outset of frying to raise frying temperature to about 345°-350° F. in about 4½ minutes.

●: initial frying temperature of 220° F.; heat added at outset of frying to raise frying temperature to about 330° F. in about 3½-4 minutes.

△: control-chips fried to completion below 300° F.

☐: initial frying temperature 300° F.; heat added after 4 minutes frying time to raise frying temperature to about 355° F.

O: initial frying temperature 280° F.; heat added after 4 minutes frying time to raise frying temperature to about 345° F.

△: initial frying temperature 260° F.; heat added after 4 minutes frying time to raise frying temperature to about 345° F.

■: initial frying temperature 220° F.; heat added after 4 minutes frying time to raise frying temperature to about 345° F.

●: Control-initial frying temperature 300° F.; chips fried to completion below 300° F.

▲: initial frying temperature 300° F.; heat added to initial frying oil after about 1¼ minutes frying time to raise frying temperature to 345°-350° F.; total fry time about 6¼ minutes.

■: initial frying temperature 300° F.; heat added to initial frying oil after about 2½ minutes frying time to raise frying temperature to 350°-355° F.; total fry time about 6¾ minutes.

X: control-initial frying temperature 300° F.; chips fried to completion below 300° F.; total fry time 9 minutes.

DETAILED DESCRIPTION OF THE DRAWINGS

Figure 1:
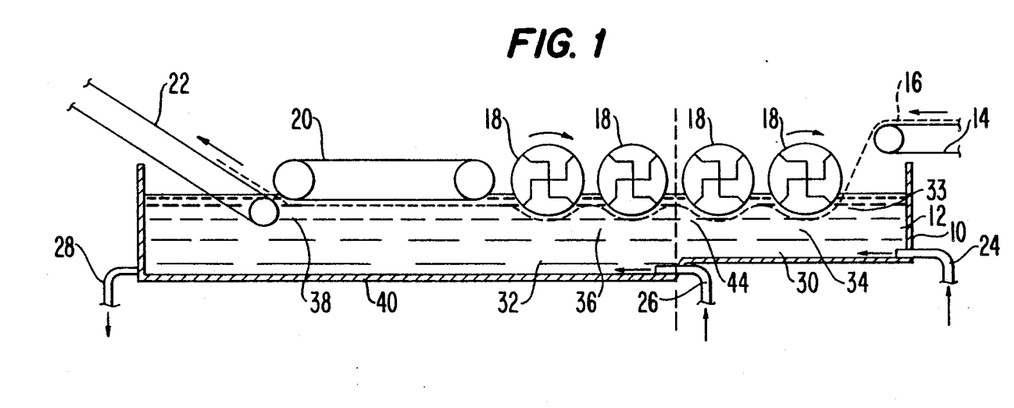
FIG. 1 is a schematic diagram showing an apparatus for frying potato chips according to the present invention.

FIG. 1 schematically illustrates an apparatus which may be used for continuously producing potato chips according to one embodiment of the invention. The apparatus includes an oil tank 10 for containing frying oil 12. A potato slice input conveyor 14 is provided for continuously introducing potato slices 16 into the frying oil, and any suitable means such as rotating paddle wheels 18 and/or submerging conveyor 20 is provided for continuously conveying potato slices through the frying oil. An endless take-out conveyor 22 is further provided for continuously removing fried potato chips from the frying oil.

First and second inlets 24 and 26, respectively, feed hot frying oil into the tank 12, and an outlet 28 is provided for withdrawing oil from the tank. In this embodiment, the first oil inlet 24 feeds a first portion 30 of the tank 10 with oil at a temperature of from about 115° C.

to about 155° C. (about 240° F. to about 310° F.), and the second oil inlet 26 feeds a second portion 32 of the tank 10 with oil at a temperature of from about 165° C. to about 185° C. (about 330° F. to about 365° F.). See FIGS. 1 and 2. The oil flows towards and exits oil outlet 28 for reuse. If desired, a second oil outlet can be provided between the first and second tank portions 30 and 32, respectively.

Potato slices 16 are continuously introduced into the initial frying region 34 within tank portion 30. As noted, tank portion 30 is fed oil through oil inlet 24 to provide the initial frying region with frying oil at a temperature of from about 115° C. to about 155° C. (about 240° F. to about 310° F.).

The potato slices 16 are continuously conveyed through the initial frying region for a period generally of at least about 1 minute but usually not more than about 3 minutes. The time during which the potato slices remain in the initial frying region can be controlled by the speed of oil flow in the initial frying region towards oil outlet 28 and the speed of rotation of paddle wheels 18.

According to one embodiment, the potato slices remain in the initial frying region 34 at least about 2 minutes.

Paddle wheels 18 continuously convey the potato slices from the initial frying region to the final frying region 36 within tank portion 32. Tank portion 32 is fed oil from oil inlet 26 which mixes with oil flowing from tank portion 30 to provide a final frying region having a temperature of from about 165° C. to about 180° C. (about 330° F. to about 365° F.). If desired, rotating paddle wheels 18 and submerger conveyor 20 can be used as illustrated to convey the potato slices through the final frying region 36 in tank portion 32 to finish-fry the potato slices into potato chips having a moisture content of about 2% by weight or less, whereupon the potato chips are continuously removed from the final frying region of the oil by take-out conveyor 22.

According to one embodiment, oil in the initial frying region has a temperature of from about 125° C. to about 150° C. (about 260° F. to about 300° F.) and the final frying region contains oil having a temperature of from about 170° C. to about 175° C. (about 340° F. to about 350° F.) to finish-fry the chips.

Figure 2:
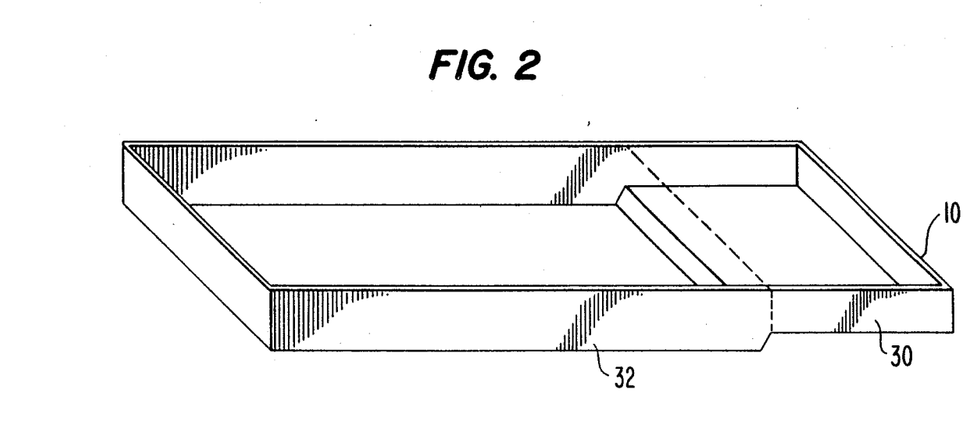
FIG. 2 is a perspective view partially schematic of the oil vat or tank shown in FIG. 1.

If desired, the bottom portion 40 of tank 10 can be stepped as illustrated in FIGS. 1 and 2 to provide for volume increase of oil brought about by addition of oil through oil inlet 26. This permits addition of a large amount of hot oil in oil inlet 26 for raising the temperature of the oil in the final frying region a desired level. Any suitable number of frying zones may be utilized to achieve the desired temperature profile.

With an apparatus as illustrated in FIGS. 1 and 2, oil flows from the initial frying region 34 into the final frying region 36, creating a transition region through which the potato slices are conveyed between the initial and final frying regions. The transition region is maintained at a temperature at least equal to the temperature in the initial frying region.

According to one embodiment, oil in the initial frying region 34 has a temperature of from about 130° C. to about 150° C. (about 270° F. to about 300° F.). In a presently preferred embodiment, oil in the initial frying region is at a temperature of about 150° C. (about 300° F.) with potato slices being introduced into the initial frying region and conveyed therethrough over a period of about 2-3 minutes to a portion of the initial frying region where the temperature is about 130° C. (about 270° F.). If using a tank as shown in FIGS. 1 and 2, oil at a temperature of from about 175° C. to about 185° C. (about 350° F. to about 365° F.) is introduced into tank portion 32 through oil inlet 26 as potato slices are conveyed from the initial frying region through a transition region of increasing temperature to the final frying region 36. The potato slices then are continuously conveyed through the final frying region during which the temperature of the oil decreases and during which the potato slices are finish-fried to produce potato chips having a moisture content of about 2% by weight or less. The fried potato chips then are continuously removed from the final frying region by take-out conveyor 22. Oil from tank portion 32 is withdrawn through oil outlet 28 at a temperature of from about 150° C. to about 155° C. (about 300° F. to about 310° F.), and is thereafter filtered, reheated and recycled through the system.

The present invention also relates to an apparatus for continuously producing fried potato chips. FIGS. 1 and 2 are exemplary of an apparatus according to the invention.

Other suitable means can be utilized to provide frying regions of different temperatures. For example, thermal barriers can divide a single tank at 44 to minimize the temperature transition region and keep regions 34 and 36 more temperature distinct.

Figure 3:
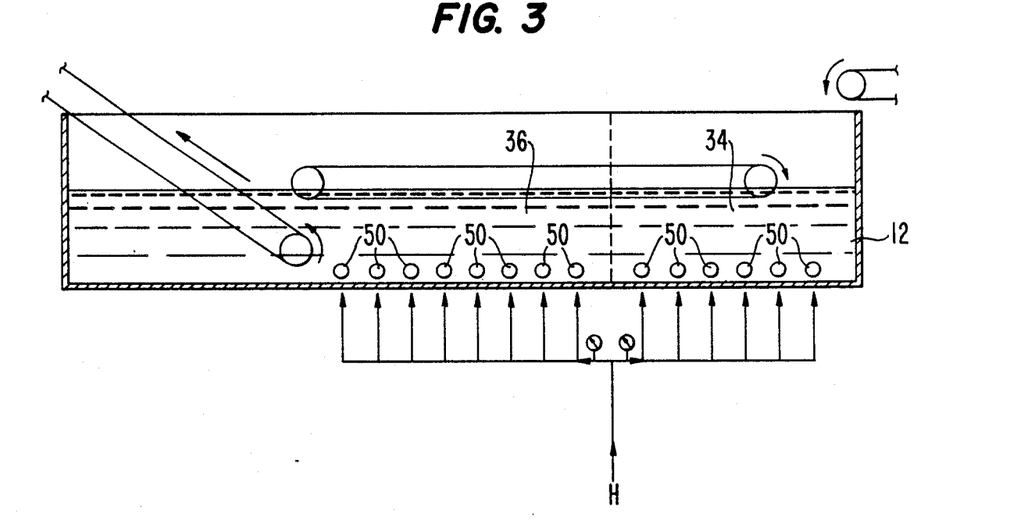
FIG. 3 is a schematic diagram showing a second type of apparatus for producing potato chips according to the present invention.

The initial frying region 34 of oil 12 in a single tank can be heated to a different temperature than oil in the final frying region 36 of the same tank by means of natural gas flame or steam heating H within tubes 50 submerged within the different frying regions of the oil. See FIG. 3.

Figure 4:
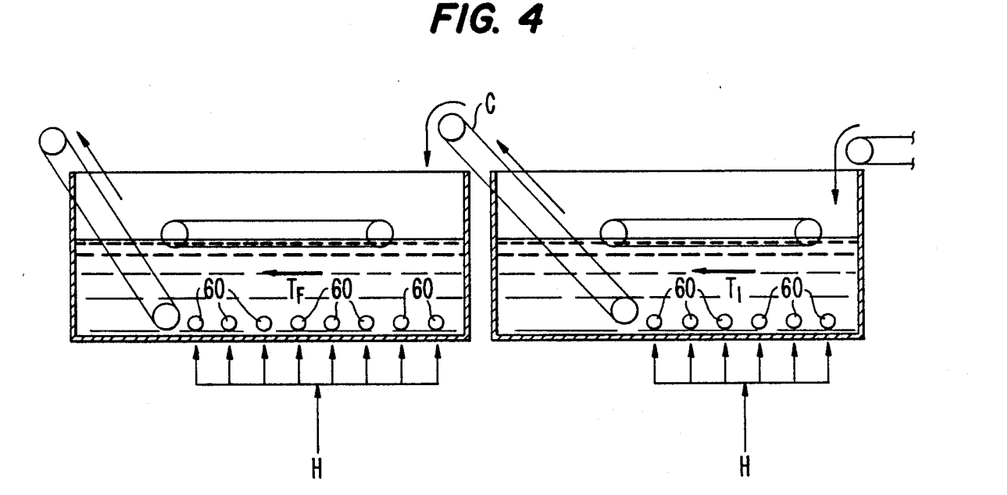
FIG. 4 is a schematic diagram showing a third type of apparatus for producing potato chips according to the present invention.

Alternatively, a first tank $T_1$ can provide the initial frying region of frying oil at low temperature, and a final tank $T_F$ can provide the final frying region of higher temperature oil with a conveyor C providing a transition region and means for transferring the potato slices between tanks $T_1$ and $T_F$. See FIG. 4. The temperature of the oil in tanks $T_1$ and $T_F$ can be maintained at the desired levels by any suitable means such as natural gas flame or steam heating H in tubes 60 submerged in the frying oil.

Initially frying potato slices at a low temperature and thereafter finish-frying potato slices at a high temperature provides a rapid continuous process for the production of potato chips having a batch-fried texture and flavor. Although the temperature and time profiles of conventional batch-fried chips are substantially different from the temperature profiles of multiple stage continuous fry chips according to the invention, potato chips produced according to the continuous fry process of this invention are similar in texture and flavor to batch, kettle-fried potato chips, and distinctly different in texture and flavor from conventional continuously produced potato chips. Moreover, potato chips can be produced according to the present invention at a higher rate of speed than batch kettle frying of potato chips, e.g., about 6-8 minutes or less for the invention compared to about ten minutes or more for batch frying, and at a substantial economic savings.

The invention will further be described by the following examples which are not intended to be limiting.

EXAMPLE I

ESTABLISHING A TYPICAL BATCH-TYPE FRYING

TEMPERATURE PROFILE

Figure 5:
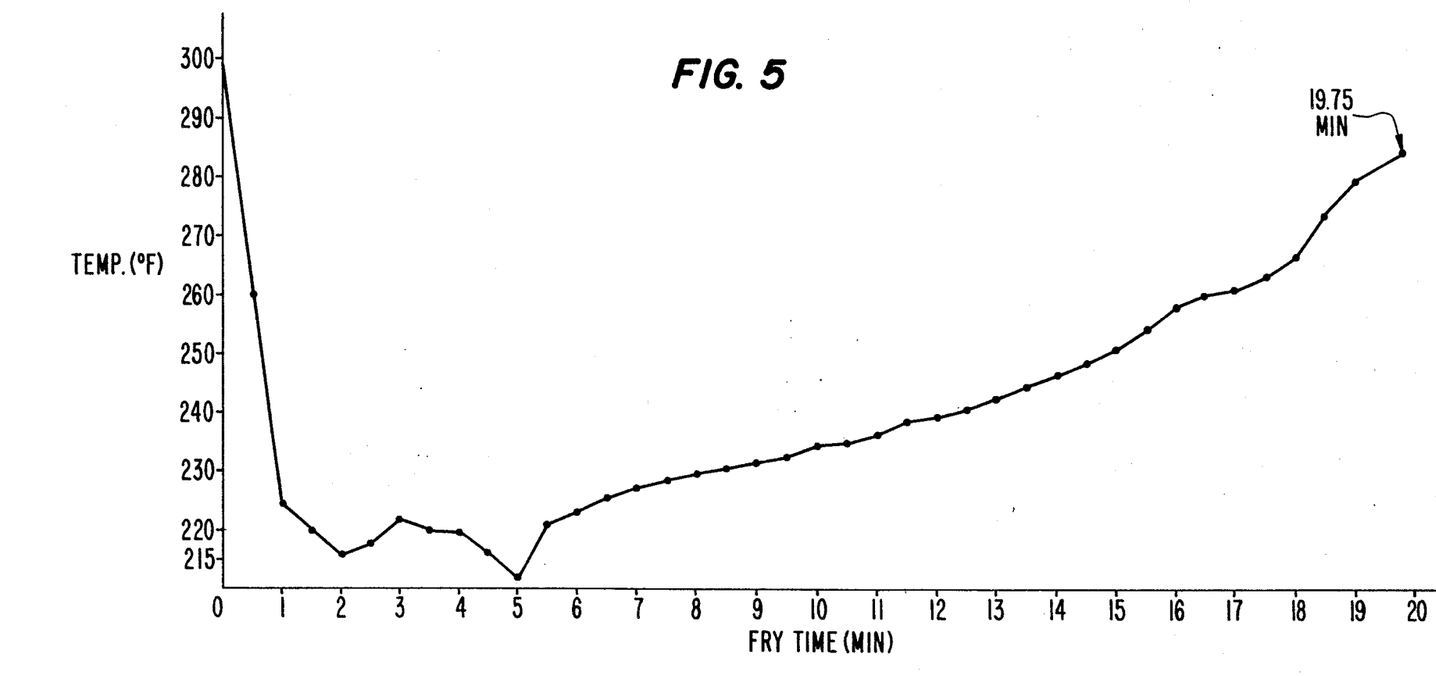
FIG. 5 graphically illustrates a temperature profile for batch production of potato chips on a laboratory scale.

Raw potatoes were peeled and sliced for kettle frying as a batch on a laboratory scale. 500 Grams of potato slices were added to 4 liters of hot frying oil at a temperature of 300° F. The oil temperature dropped to about 225° in about 1 minute and to below 215° in about 5 minutes before gradually beginning to rise to a temperature of 275°. The bubble end point of the chips was reached after about 19.75 minutes whereupon the chips were removed from the kettle of frying oil. The chips had characteristic kettle-fried hardness and flavor, but required nearly 20 minutes frying time on a laboratory scale. FIG. 5 illustrates a typical temperature profile for batch-fried chips, although the frying time probably could be about 10-11 minutes for batch frying on a production scale.

EXAMPLE II

EFFECT OF TIME DURATION IN LOW TEMPERATURE

INITIAL FRYING OIL ON FINAL CHIP TEXTURE

Figure 6:
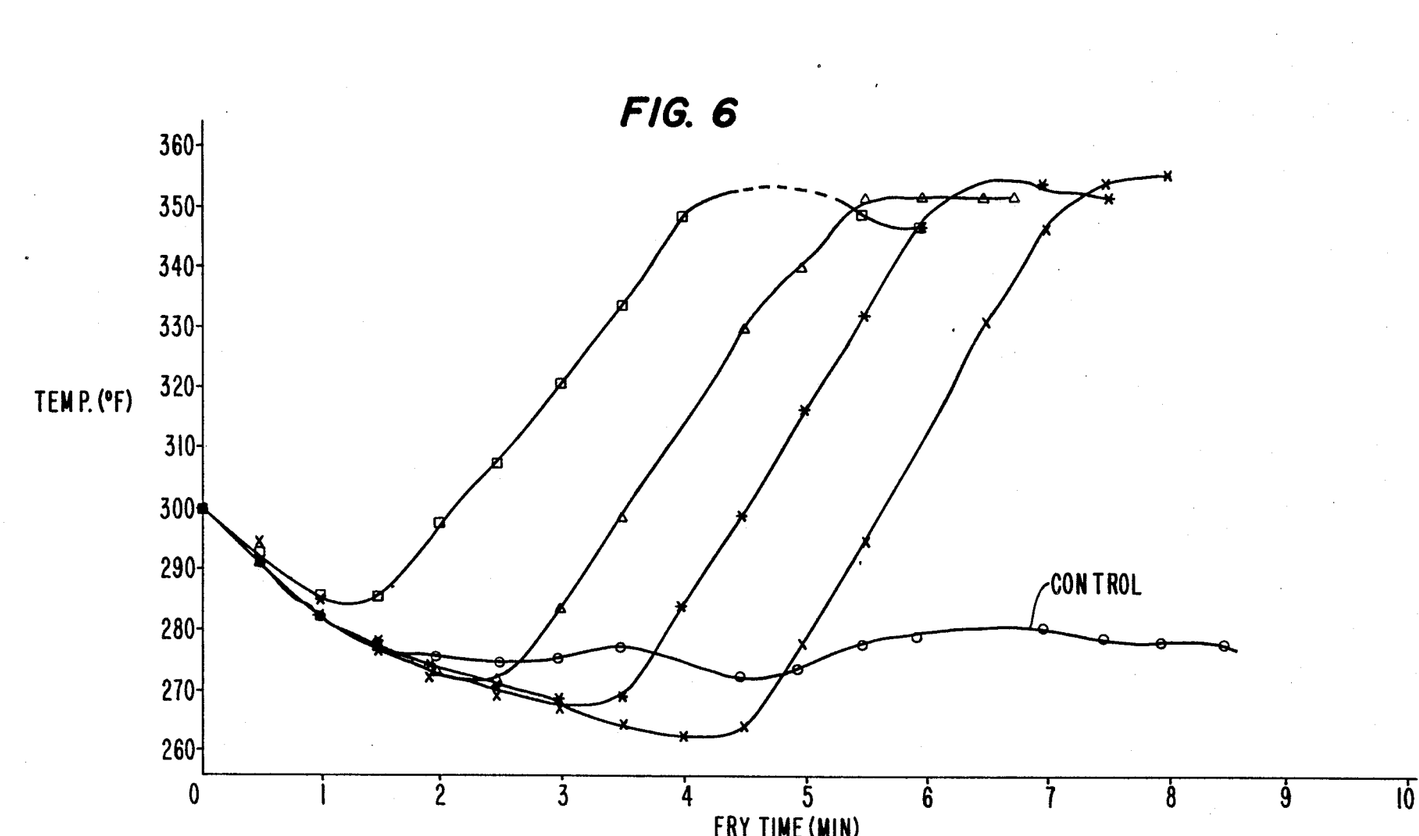
FIG. 6 graphically illustrates the effect of time duration in an initial low temperature frying region according to the invention wherein the chips are finish-fried at a high temperature, compared to control chips fried to completion in a low temperature frying region. The legend for FIG. 6 is as follows.

Raw potato slices were fried under experimental test conditions to determine the effect of time duration in the low temperature initial frying region against control chips fried to completion in the low temperature frying region. Four multi-stage tests were performed starting at an initial frying temperature of about 150° C. (about 300° F.) for one, two, three and four minutes respectively, before raising the frying temperature to a final frying temperature of about 175° C. (about 350° F.). The temperature profiles of the frying conditions for these tests are illustrated in FIG. 6. The multi-stage fry chips that were kept in the low temperature frying region for the shortest period of time (one minute) had similar batch-type textural characteristics to the single-stage fried control chips, but took about 2½ minutes less to fry to completion. The multi-stage fry chips that were kept in the initial low temperature frying oil the longest (four minutes) had an even harder texture than the control chips, with the intermediate tests having characteristics falling in between the shortest and longest initial fry chips.

EXAMPLE III

EFFECT OF RESIDENCY TIME IN LOW TEMPERATURE

INITIAL FRYING OIL AND RATE OF MOISTURE REMOVAL

FROM POTATO SLICES ON FINAL CHIP TEXTURE

Figure 7:
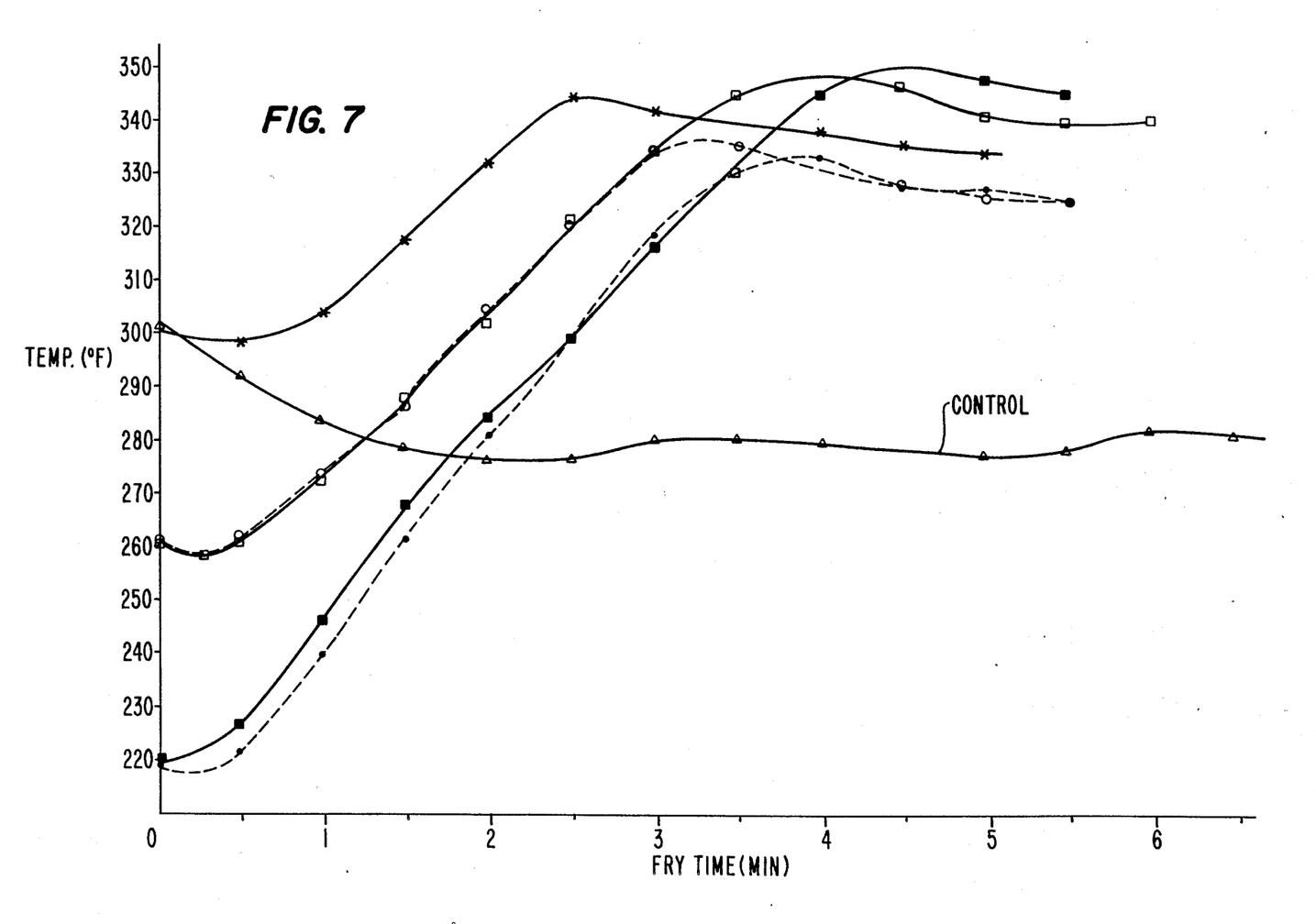
FIG. 7 graphically illustrates temperature profiles for single-stage fry control chips compared to two-stage fry chips at various initial frying temperatures for different time durations. The legend for FIG. 7 is as follows.

FIG. 7 illustrates a temperature profile for single-stage fry control chips fried to completion in the low temperature frying region compared to temperature profiles for multi-stage fry chips fried using various initial frying temperatures for various time durations.

Five multi-stage tests were performed starting at an initial frying temperature at or below about 150° C. (about 300° F.), with final frying temperatures of about 175° C. (about 350° F.).

In one test, heat was added at the outset of frying to oil having an initial frying temperature of about 150° C. (about 300° F.) to immediately begin to raise the oil temperature above 150° C. (about 300° F.) and thereafter achieve a final frying temperature of about 175° C. (about 350° F.). This test produced texturally soft chips similar to conventional continuously produced chips and distinctly different from typical batch-produced chips, due to the short low temperature initial fry. In this test, the residence time of the slices at the low initial frying temperature was insufficient to set the characteristic batch-type texture.

In second and third tests, the initial frying temperature was about 125° C. (about 260° F.), and in fourth and fifth tests the initial frying temperature was about 105° C. (about 220° F.). In each of tests two through five, heat was added to the frying oil at the outset of frying to immediately begin to raise the oil temperature, while keeping the slices below about 155° C. (about 310° F.) for about 2-5 minutes, considerably longer than during the first test. In these four tests, it is believed that moisture was removed from the slices at a slower rate than in the first test because of the lower frying oil temperatures.

The multi-stage fried chips in the first test initially fried at about 300° F. but kept in the low temperature fry for the least amount of time (less than about 1 minute) were considerably softer than the other multi-stage fry chips of the second, third, fourth and fifth tests, which had comparable hardness and were closest to the control chips. The control chips had the hardest texture apparently due to longer duration at lower frying temperature.

EXAMPLE IV

CHARACTERISTICALLY BATCH-TYPE CHIPS PRODUCED

USING VARIOUS LOW INITIAL FRYING TEMPERATURES

Figure 8:
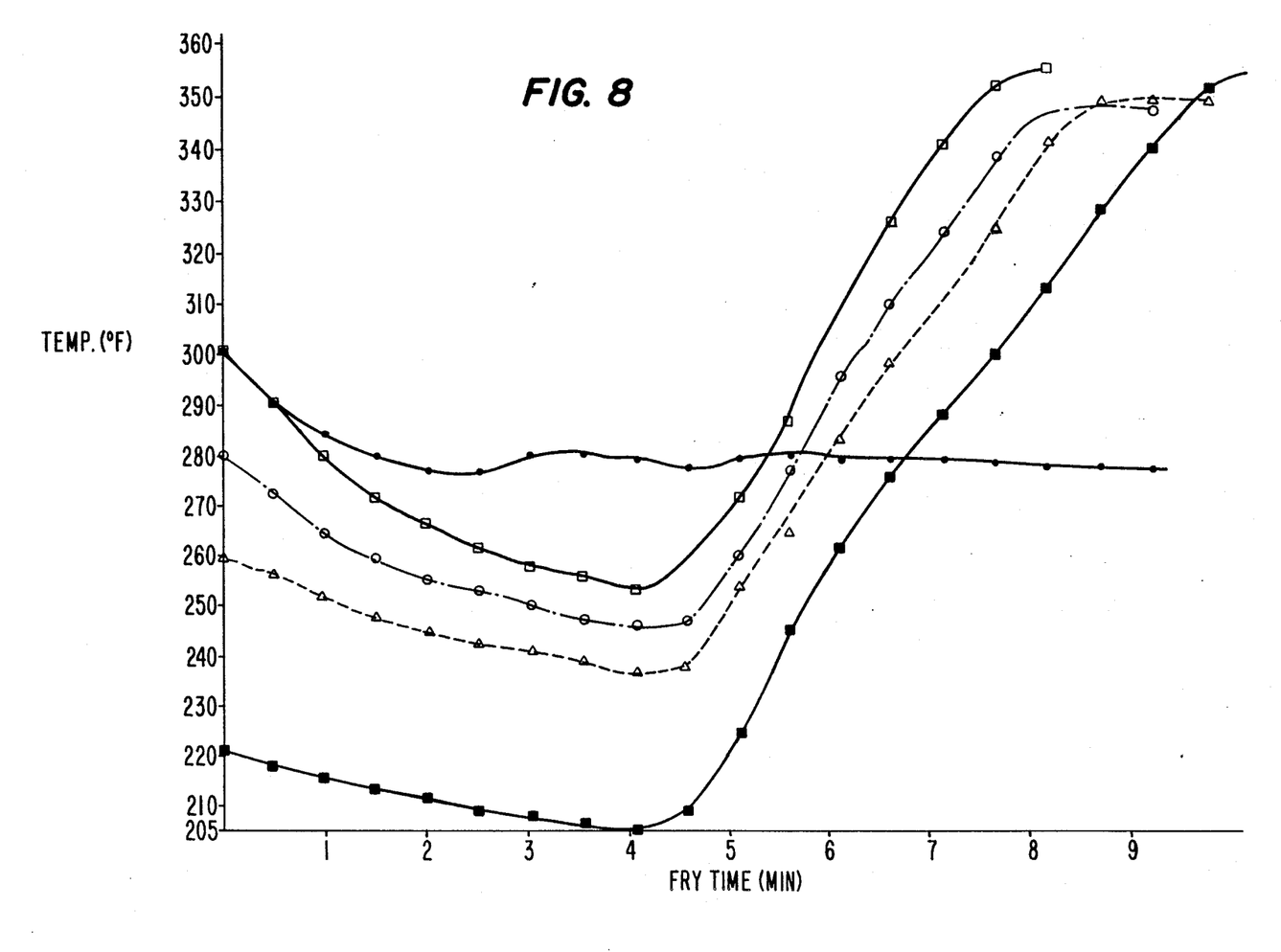
FIG. 8 graphically illustrates temperature profiles for single-stage fry control chips compared to two-stage fry chips fried at various initial frying temperatures. The legend for FIG. 8 is as follows.

FIG. 8 shows a temperature profile for single-stage fry control chips fried to completion in low temperature frying oil compared to temperature profiles for multi-stage fry chips according to the invention fried using various initial frying temperatures.

Four multi-stage tests were performed starting at respective initial frying temperatures of about 150° C. (about 300° F.), 140° C. (about 280° F.), 125° C. (about 260° F.) and 105° C. (about 220° F.), before adding heat after about 3-4 minutes to achieve a final frying temperature of about 175° C. (about 350° F.). All four multi-stage tests produced chips of comparable hardness to the single-stage control, even at an initial frying temperature of about 105° C. (about 220° F.).

The data indicates that in this test, an initial frying temperature of about 300° F. in a multi-stage fry results, for chips of comparable hardness, in a shorter fry time than that required in single-stage frying. In fact, when an initial temperature of 300° F. was employed in multi-stage frying, the total fry time required to achieve the desired end moisture was less than that required at lower initial fry temperatures.

EXAMPLE V

CHARACTERISTICALLY BATCH-TYPE CHIPS PRODUCED WITH VARYING LOW TEMPERATURE FRY TIMES

Figure 9:
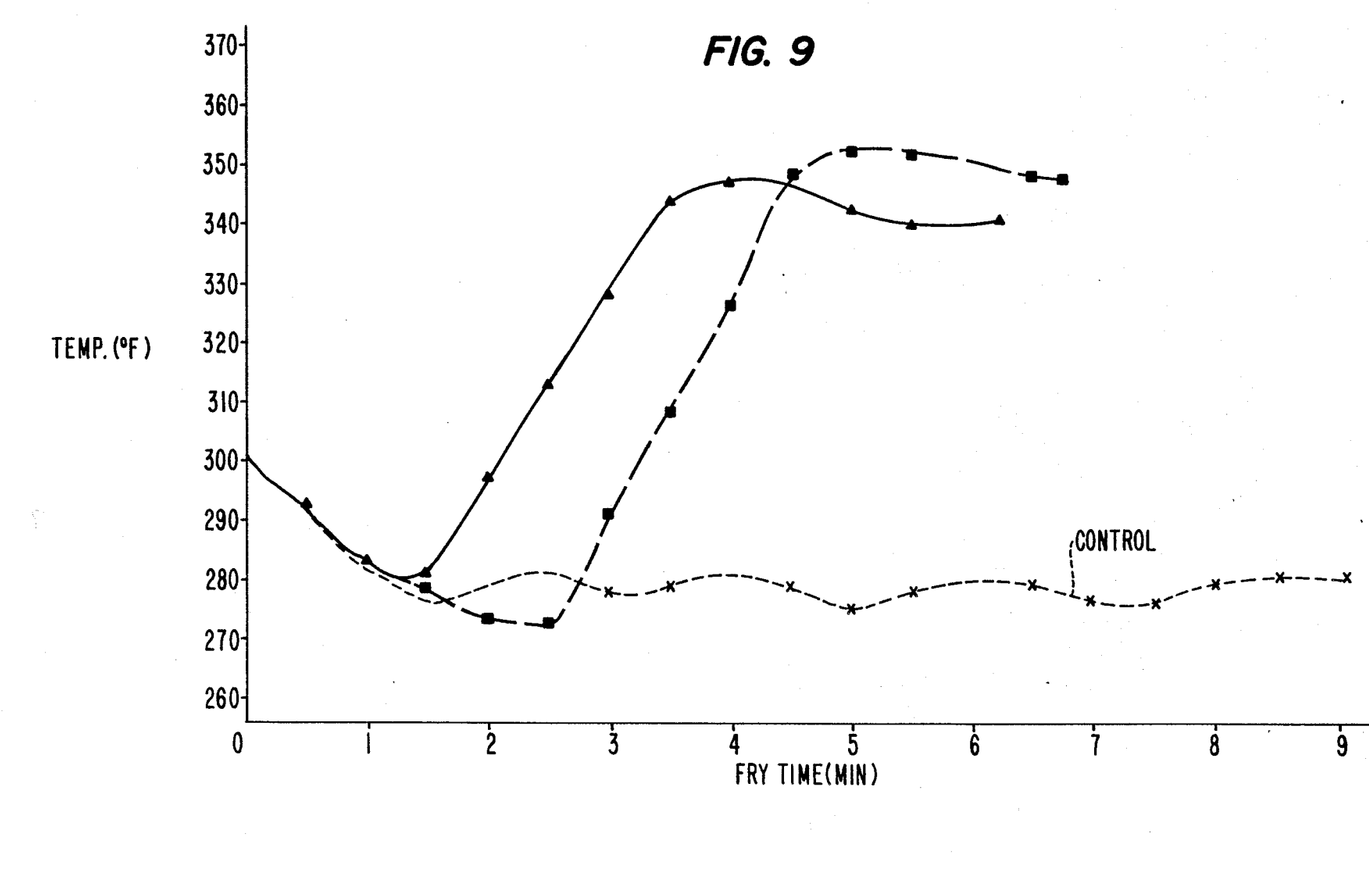
FIG. 9 graphically illustrates temperature profiles from two-stage fry chips according to the invention compared to temperature profiles for single-stage fry control chips. The legend for FIG. 9 is as follows.

FIG. 9 shows two temperature profiles for multi-stage fry chips according to the invention compared to a temperature profile for single-stage fry control chips fried to completion in low temperature frying oil.

Two multi-stage tests were performed starting at an initial frying temperature of about 150° C. (about 300° F.). These two multi-stage tests were initially fried for about 1½ and 2½ minutes respectively in the low temperature oil before raising the frying temperature to a final frying temperature of about 175° C. (about 350° F.). Both multi-stage tests produced chips of comparable hardness to control chips, but with fry times about 2 to 2½ minutes less than control.

What is claimed is:

1. A continuous process for the production of potato chips having batch-fried texture and flavor characteristics comprising:
    (a) continuously introducing potato slices into an initial frying region of frying oil, the initial frying region having a temperature of from about 115° C. to about 155° C. (about 240° F. to about 310° F.);
    (b) preparing partially fried potato slices by partially frying the potato slices in the initial frying region for at least 1 minute;
    (c) continuously conveying the partially fried potato slices from said initial frying region to a final frying region of frying oil, the final frying region having a temperature of about 165° C. to about 185° C. (about 330° F. to about 365° F.);
    (d) producing potato chips having batch-fried texture and flavor characteristics by finish-frying the partially fried potato slices in the final frying region to about the bubble end point of the potato slices; and
    (e) continuously removing the potato chips from the final frying region of frying oil.

2. The process of claim 1 wherein the potato chips are continuously removed from the final frying region with a moisture content of about 2% by weight or less.

3. The process of claim 1 wherein the initial frying region has a temperature of from about 125° C. to about 150° C. (about 260° F. to about 300° F.), and the final frying region has a temperature of from about 170° C. to about 175° C. (about 340° F. to about 350° F.).

4. The process of claim 1 wherein the potato slices remain in the initial frying region for from about one to about three minutes.

5. The process of claim 1 wherein the potato slices remain in the final frying region for from about 5 to about 6 minutes.

6. The process of claim 1 wherein said potato chips having batch-fried texture and flavor characteristics are fried for a total period of time of from about 6 to about 8 minutes.

7. The process of claim 1 wherein during continuous conveying of the potato slices from said initial frying region to said final frying region, the potato slices are conveyed through a transition region.

8. The process of claim 7 wherein the temperature in said transition region increases between the temperature of said initial frying region and the temperature of said final frying region.

9. The process of claim 8 wherein said transition region comprises frying oil.

10. A continuous process for the production of potato chips having a batch-fried texture and flavor comprising:
    (a) continuously introducing potato slices into an initial frying region of frying oil at a temperature of about 150° C. (about 300° F.), the potato slices remaining in the initial frying region for from about one to about three minutes;
    (b) continuously conveying the potato slices from the initial frying region through a transition region of frying oil to a final frying region having a temperature of from about 170° C. to about 175° C. (about 340° F. to about 350° F.), the temperature of the transition region increasing from the temperature of said initial frying region to the temperature of said final frying region;
    (c) continuously conveying the potato slices through the final frying region of frying oil during which the potato slices are finish-fried to produce potato chips having a moisture content of about 2% by weight or less and batch-fried texture and flavor characteristics; and
    (d) continuously removing the fried potato chips from the final frying region.

* * * * *